United States Patent [19]

MacDonald et al.

[11] Patent Number: 5,696,927
[45] Date of Patent: Dec. 9, 1997

[54] MEMORY PAGING SYSTEM AND METHOD INCLUDING COMPRESSED PAGE MAPPING HIERARCHY

[75] Inventors: James R. MacDonald, Buda; Drew Dutton; Steve Cox, both of Austin, all of Tex.

[73] Assignee: Advanced Micro Devices, Inc., Sunnyvale, Calif.

[21] Appl. No.: 576,100

[22] Filed: Dec. 21, 1995

[51] Int. Cl.⁶ ................................................. G06F 12/08
[52] U.S. Cl. ...................... 395/417; 395/463; 395/455; 395/497.03; 395/888
[58] Field of Search ................................ 395/413, 888, 395/415, 417, 403, 412, 416, 418, 419, 460–463, 455, 497.01–497.04

[56] References Cited

U.S. PATENT DOCUMENTS

| | | | |
|---|---|---|---|
| 5,237,675 | 8/1993 | Hannon, Jr. | 395/888 |
| 5,247,638 | 9/1993 | O'Brien et al. | 395/888 |
| 5,485,526 | 1/1996 | Tobin | 382/232 |
| 5,490,260 | 2/1996 | Miller et al. | 395/427 |
| 5,537,658 | 7/1996 | Bakke et al. | 395/888 |
| 5,555,395 | 9/1996 | Parks | 395/427 |

FOREIGN PATENT DOCUMENTS

| | | |
|---|---|---|
| 95/14274 | 5/1995 | WIPO . |
| 95/18997 | 7/1995 | WIPO . |

OTHER PUBLICATIONS

Andrew W. Appel and Kai Li, "Virtual Memory Primitives for User Programs", 19(1991) Apr., pp. 96–107, Department of Computer Science Princeton University 8345 Computer Architecture News, No. 2, New York, US.

*Primary Examiner*—Matthew M. Kim
*Assistant Examiner*—Hoai V. Ho
*Attorney, Agent, or Firm*—Skjerven, Morrill, MacPherson, Franklin & Friel, L.L.P.; David W. O'Brien

[57] ABSTRACT

A memory paging and compression system for a computer having a memory and an execution unit includes an address mapping hierarchy, a compressed page mapping hierarchy, a translation lookaside buffer, and a compression/decompression component. The address mapping hierarchy includes page tables having page table entries which map from a first portion of virtual addresses to respective pages in physical memory. The compressed page mapping hierarchy includes compressed page tables having compressed page table entries mapping from the first portion of virtual addresses to respective compressed pages in physical memory. The translation lookaside buffer caches recently used ones of the mappings from the first portion of virtual addresses to respective pages in physical memory. The compression/decompression component includes a compression/decompression engine coupled between a memory and an execution unit for alternately compressing and decompression pages in memory in respective correspondence with spills from and loads to the translation lookaside buffer. The address mapping hierarchy and compressed page mapping hierarchy may be represented in memory and the compression/decompression component may further include a decompression fault handler and a compression fault handler, each executable on the execution unit.

21 Claims, 8 Drawing Sheets

MEMORY PAGING SYSTEM AND METHOD INCLUDING COMPRESSED PAGE MAPPING HIERARCHY

BACKGROUND OF THE INVENTION

1. Field of the Invention

The present invention relates to data compression, and more particularly to a compression/decompression engine integrated with a memory paging system.

2. Description of the Related Art

Physical memory size is a limiting factor for many computer systems. As memory prices have fallen, software designers have dramatically increased their expectations about the amount of physical memory available for both system and application software use. As a result, modern software systems often demand large amounts of memory for efficient operation. Unfortunately, many computer systems have lagged far behind the memory demands of these modern software systems.

One technique for addressing the disparity between the memory demands of modern software systems and limited physical memory sizes is virtual memory. Virtual memory allows an application to see a computer system as providing a large primary memory, which in reality is smaller, more fragmented, and/or partially simulated by secondary storage. Applications address memory through virtual addresses, which are mapped by special hardware or software onto physical addresses. Paging and segmentation are two common implementations of virtual memory.

Some processors, such as microprocessors which conform to the x86 microprocessor architecture provide both segmentation and paging. In these microprocessors, virtual addresses are known as logical addresses and are mapped to linear addresses by the segmentation mechanism. Linear addresses are then mapped to physical addresses by the paging mechanism. For example, FIG. 1A depicts the two level paging mechanism of a microprocessor available from Advanced Micro Devices (located in Sunnyvale, Calif.) under the trade designation Am386™ DX.

In this microprocessor, paging unit 100 receives a 32-bit linear address 109 from a segmentation unit (not shown) and maps the linear address 109 to a physical address 110 using a page directory and page table entries. A page directory physical base address register 101 contains the starting address of page directory 102. On the Am386™ DX microprocessor, the page directory 102 is 4 KBytes long and allows up to 1024 page directory entries. The upper 10 bits 105 of linear address 109 are used as an index to select a particular page directory entry from page directory 102. Each page directory entry, e.g., page directory entry 103, contains the base address of a page table and information about the addressed page table. For example, page directory entry 103 provides the base address of page table 104. Each page table is 4 KBytes long and allows up to 1024 page table entries. The middle 10 bits 106 of linear address 109 are then used as an index to select a particular page table entry from page table 104. Each page table entry, e.g., page table entry 108, contains the base address of a page frame and information about the addressed page frame. For example, page table entry 108 provides the base address for page frame 111. The lower 12 bits 107 of linear address 109 are then used as an index to select a particular memory location from within page frame 111. The page frame base address and the lower 12 bits 107 of linear address 109 combine to form the physical address 110 of a memory location accessed via the paging mechanism.

Figure 1A:
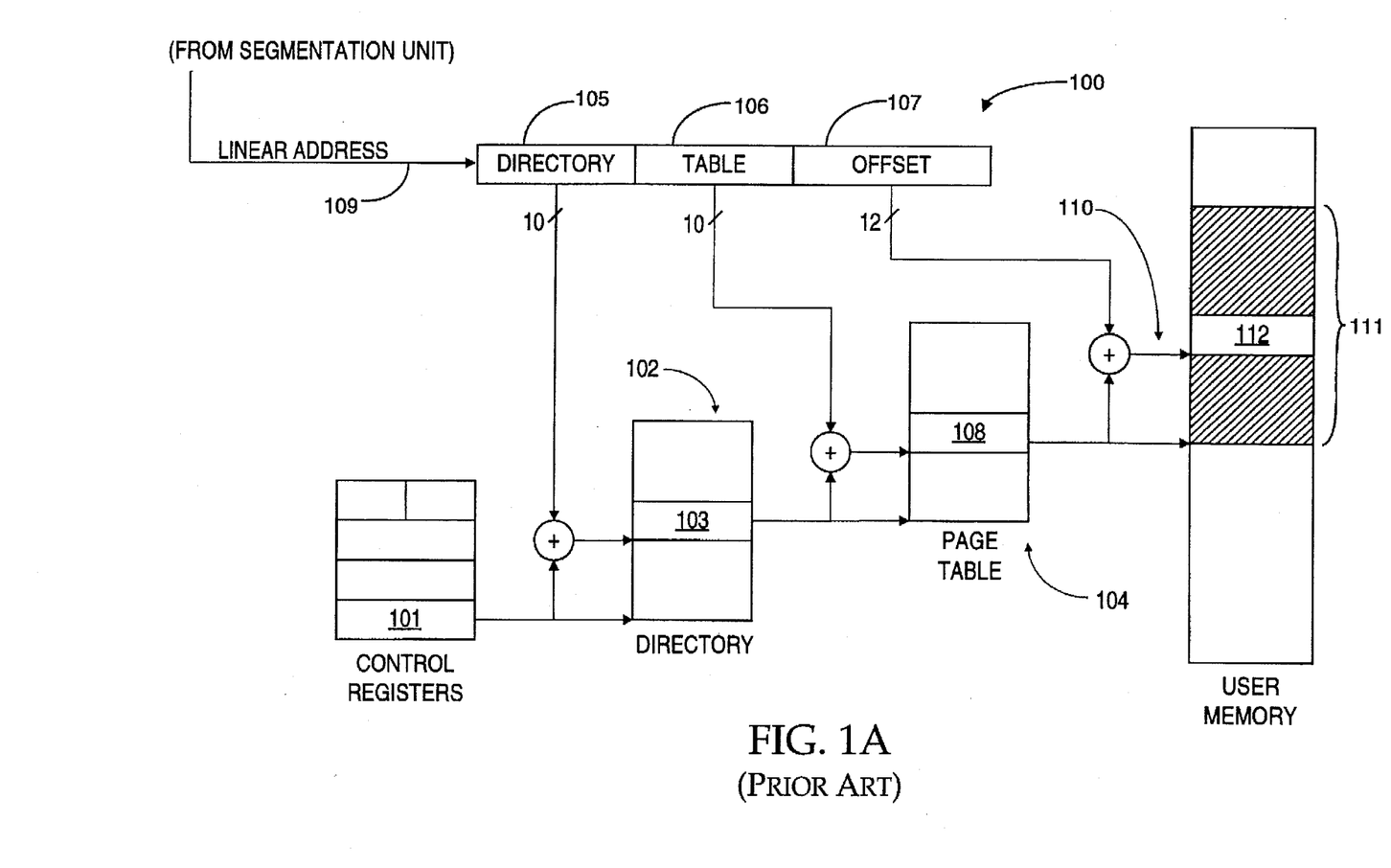
FIG. 1A is a functional block diagram depicting the conventional mapping of linear addresses to physical addresses in the memory paging system of a microprocessor conforming to the x86 processor architecture.
Figure 1B:
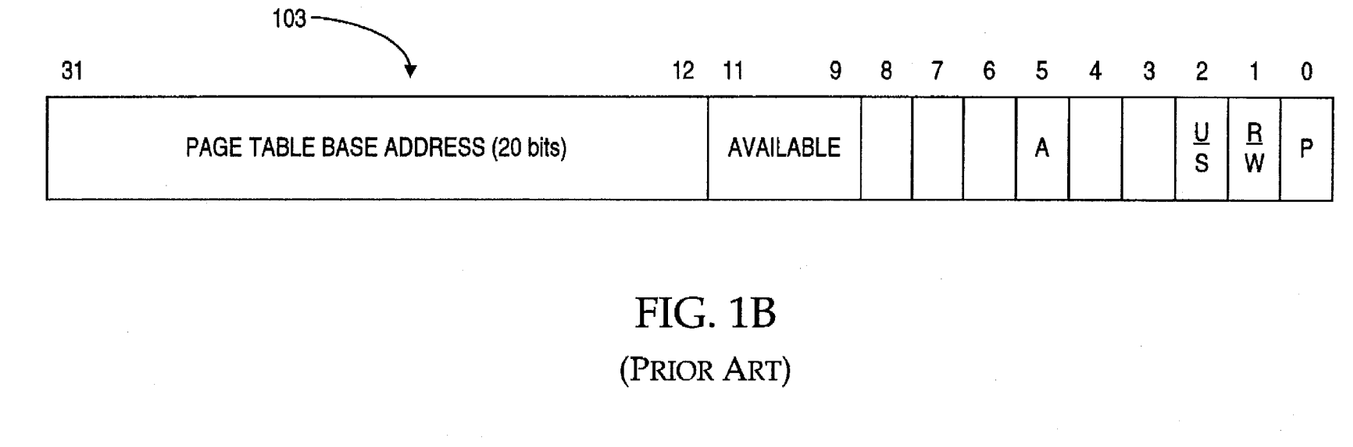
FIG. 1B is a pictorial illustration of a conventional page directory entry for the memory paging system of an x86 conforming microprocessor.
Figure 1C:
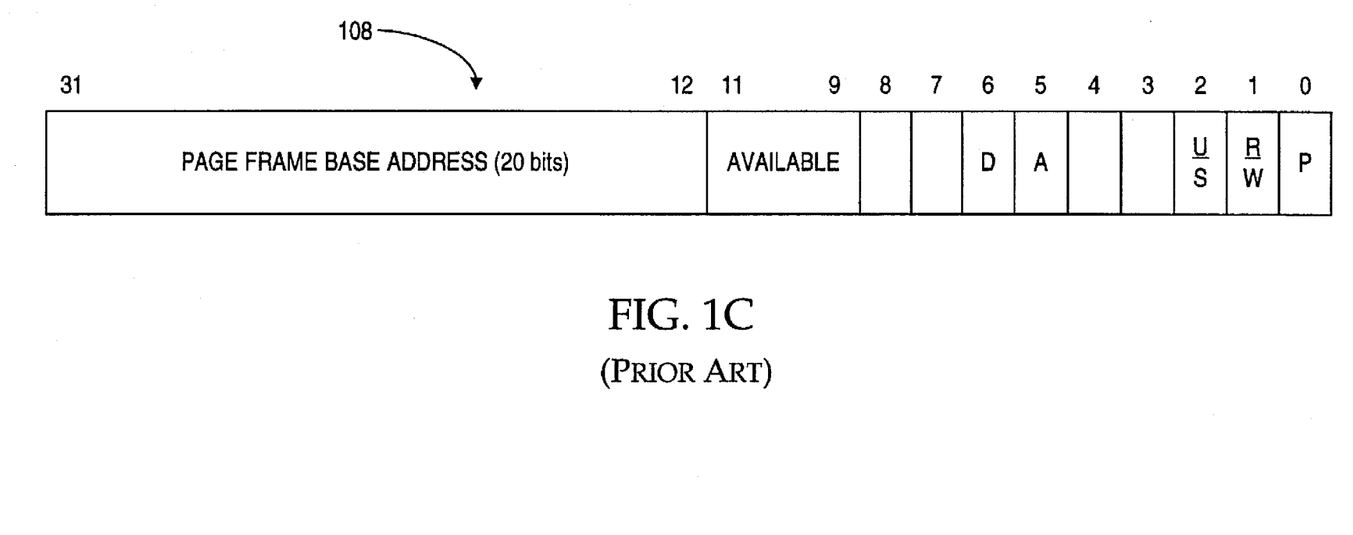
FIG. 1C is a pictorial illustration of a conventional page table entry for the memory paging system of an x86 conforming microprocessor.

FIG. 1B and 1C show the fields of page directory entry 103 and page table entry 108, respectively. The lower 12 bits of page directory entry 103 and of page table entry 108 contain information about page tables and pages frames respectively. The P (present) bit 0 indicates whether a page directory or page table can be used for address translation, i.e., whether the corresponding page table or page frame is present in memory. Both page directory 102 and page tables such as 104 reside in physical memory; however, individual page tables, like page frames, may be swapped out to a backing store at any particular time. The A (accessed) bit 5 is set by the microprocessor for both types of entries before a read or write access occurs to an address covered by the entry. The D (Dirty) bit 6 of a page table entry, e.g., page table entry 108, is set before a write to an address covered by the page table entry. Bits 9–11 of both types of entry are available for operating system use, for example to store information about page aging. By keeping track of how long a page has been in memory since last accessed, an operating system can implement a page replacement algorithm such as Least Recently Used (LRU). The U/S and R/W bits 2 and 1 are used to provide User/Supervisor and Read/Write protection for individual pages (U/S and R/W bits of page table entry 108) or for all pages covered by a page directory entry (U/S and R/W bits of page directory entry 103).

In addition to the paging mechanism shown in FIG. 1, most paging systems also maintain a cache of recently used virtual-to-physical address mappings (i.e., page table entries). This cache, known as a translation look aside buffer, TLB (not shown), can significantly reduce the number of times the processor must access the two level page structure of FIG. 1.

On the Am386™ DX microprocessor, which includes a TLB, the paging hardware operates as follows. The paging unit receives a 32-bit linear address from the segmentation unit. The upper 20 bits of the linear address are compared with entries in the TLB to determine if there is a match. If there is a match (i.e., a TLB hit), then the 32-bit physical address is generated from the matched TLB entry and placed on the address bus to address physical memory. However, if the page table entry is not in the TLB (i.e., a TLB miss), the processor will read the page directory. If the page directory entry indicates that the page table is in memory (i.e., if P=1), the processor will read the referenced page table entry and set the A-bit in the page directory entry. If the referenced page table entry indicates that the page frame is in memory (i.e., if P=1), the processor will update the A and D bits of the referenced page table and access the addressed page. The upper 20 bits of the linear address are stored in the TLB to cache the paging translation for future accesses.

However, if either the page table or page frame is not present in memory (i.e., if P=0 for either the page directory entry or the page table entry), a page fault will be generated. Typically, it is the operating system's responsibility to service the page fault by loading the appropriate memory page into memory; however, dedicated memory management hardware may also service the page fault. Once the page and/or page table is loaded into memory and the data state of the TLB and page directory/table hierarchy has been updated, the memory access which generated the page fault may continue.

Another technique for addressing the disparity between memory demands of modern software systems and limited physical memory sizes is software-based compression. Compression techniques are often used to reduce the storage requirements for data stored on magnetic media or transferred across computer networks.

Compression techniques have also been used to increase the apparent size of Random Access Memory (RAM). For example, on the Apple Macintosh® computer an operating system extension called Ram Doubler (available from Connectix, Inc., of Menlo Park, Calif.) replaces standard virtual memory software and allows a suitably configured system to "compress" allocated, but unused memory. Because the Macintosh® Operating System (Mac OS) allocates and zero's out the amount of memory requested by each application, it is trivial to identify unused memory. Unused memory (consisting of null pages) may then be trivially compressed and the corresponding (previously zero) memory pages can be returned to the system heap.

SUMMARY OF THE INVENTION

It has been discovered that a compression/decompression engine can be integrated with a memory paging system of a computer processor to provide memory compression which is transparent to application software executable on the computer processor.

In one embodiment, the memory paging system includes an address mapping hierarchy, a compressed page mapping hierarchy, a translation lookaside buffer, and a compression/decompression component. The address mapping hierarchy includes page tables having page table entries which map from a first portion of virtual addresses to respective pages in physical memory. The compressed page mapping hierarchy includes compressed page tables having compressed page table entries mapping from the first portion of virtual addresses to respective compressed pages in physical memory. The translation lookaside buffer caches recently used ones of the mappings from the first portion of virtual addresses to respective pages in physical memory. The compression/decompression component includes a compression/decompression engine coupled between a memory and an execution unit for alternately compressing and decompressing pages in memory in respective correspondence with spills from and loads to the translation lookaside buffer. In a further embodiment, the address mapping hierarchy and compressed page mapping hierarchy are represented in memory and the compression/decompression component further includes a decompression fault handler and a compression fault handler, each executable on the execution unit.

In yet a further embodiment, the decompression fault handler is responsive to a faulting memory access and includes means for performing the following functions. The decompression fault handler includes means for allocating a new memory page; for supplying the physical address of the new memory page to the compression/decompression engine; for supplying the virtual address of the faulting memory access to the compression/decompression engine; for triggering decompression (by the compression/decompression engine) from a compressed representation of the page corresponding to the faulting memory access to an uncompressed representation at the new memory page; and for updating the address mapping hierarchy to indicate the physical address of the new memory page and uncompressed state of the corresponding page.

In still yet a further embodiment, the compression fault handler is responsive to a spill from the translation lookaside buffer and includes means for performing the following functions. The compression fault handler includes means for scanning a free-list for a new block in a compressed memory space; for supplying the physical address of the new block to the compression/decompression engine; for supplying the virtual address of the faulting memory access to the compression/decompression engine; triggers compression (by the compression/decompression engine) from an uncompressed representation of the page corresponding to the faulting memory access to an compressed representation at the new block; for updating the address mapping hierarchy to indicate the compressed state of the corresponding page; and for updating the compressed page mapping hierarchy to indicate the physical address and size of the corresponding compressed page.

In another embodiment, a compression/decompression subsystem for a computer having an execution unit, a memory including a hierarchy of data stores for encoding a mapping from virtual memory addresses to physical memory addresses, and a translation lookaside buffer for caching recently-used virtual to physical address mappings, includes the following: a compression/decompression engine, means residing in the hierarchy of data stores for identifying a compression state of memory-resident pages, a decompression fault handler, and a compression fault handler. The compression/decompression engine is coupled between the execution unit and the memory for alternately compressing and expanding memory-resident pages, the compression state identifying means trigger a compression fault upon a spill from the translation lookaside buffer and trigger a decompression fault upon an access to a memory page which is not represented in the translation lookaside buffer and is identified as compressed by the compression state identifying means. The decompression fault handler is responsive to the decompression fault whereupon the decompression fault handler allocates memory for a decompressed memory page, triggers decompression by the compression/decompression engine, and updates the hierarchy of data stores in accordance with the results of the decompression. The compression fault handler is responsive to the compression fault, whereupon the compression fault handler scans a free-list for a target memory block, triggers compression by the compression/decompression engine, and updates the hierarchy of data stores in accordance with the results of compression.

In still another embodiment, a method for handling a decompression fault arising from a faulting memory access includes the steps of allocating a new memory page; supplying the physical address of the new memory page to a compression/decompression engine; supplying the virtual address of the faulting memory access to the compression/decompression engine; triggering decompression (by the compression/decompression engine) from a compressed representation of the page corresponding to the faulting memory access to an uncompressed representation at the new memory page; and updating an address mapping hierarchy to indicate the physical address of the new memory page and uncompressed state of the corresponding page.

In still yet another embodiment, a method for handling a compression fault includes the steps of scanning a free-list for a new block in a compressed memory space; supplying the physical address of the new block to a compression/decompression engine; supplying the virtual address of a faulting memory access to the compression/decompression engine; triggering compression (by the compression/decompression engine) from an uncompressed representation of the page corresponding to the faulting memory access to an compressed representation at the new block; updating an address mapping hierarchy to indicate the compressed state of the corresponding page; and updating a compressed page mapping hierarchy to indicate the physical address and size of the corresponding compressed representation.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION OF THE PREFERRED EMBODIMENTS

The following sets forth a detailed description of the best contemplated mode for carrying out the invention. The description is intended to be illustrative of the invention and should not be taken to be limiting. In particular, the use of x86-related nomenclature such as "linear address" is for purposes of illustration only; such use should not be interpreted as limiting to a particular memory hierarchy or processor architecture.

Figure 2:
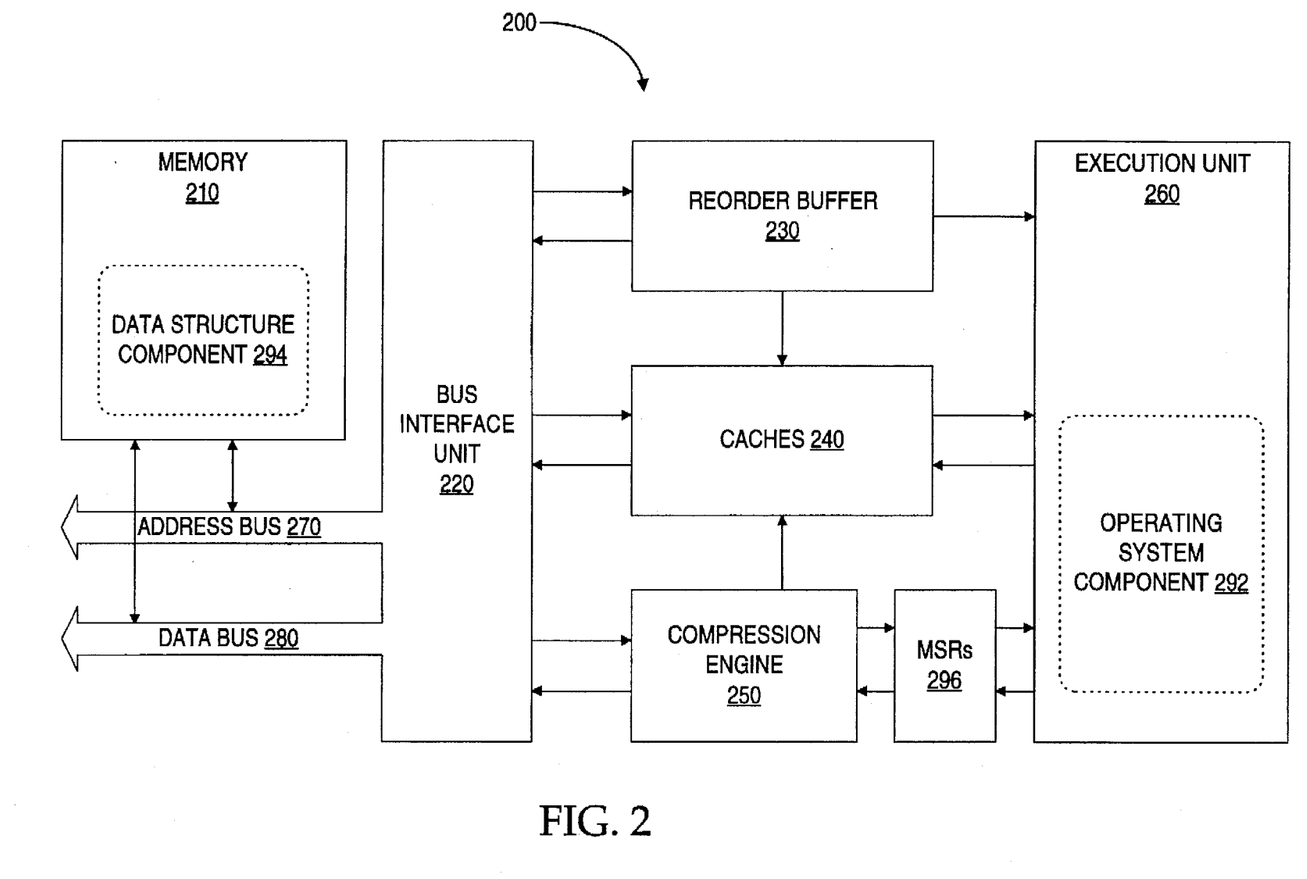
FIG. 2 is a functional block diagram of a processor providing hardware-based memory page compression in accordance with the present invention.

FIG. 2 illustrates a computer system 200 including an execution unit 260, a memory 210, and a compression engine 250. Execution unit 260 reads from and writes to addressable locations within memory 210, illustratively, via caches 240 and bus interface unit 220, although alternative embodiments may access memory more directly or via additional levels of a memory hierarchy. Components of a paging and compression system (not shown) are distributed among the execution unit 260, compression engine 250, and memory 210. In particular, a data structure component 294 of the paging and compression system is stored in memory 210. This data structure component 294 includes hierarchies of paging and compression state tables and directories which are described below with reference to FIGS. 3, 4A, 4B, 4C, and 4D. Referring back to FIG. 2, an operating system component 292 executes on execution unit 260. Operating system component 292 traverses and updates the hierarchies of paging and compression state tables and directories stored in memory 210. In addition, operating system component 292 triggers compression and decompression by compression engine 250 of selected contents of memory 210 as is described below with reference to FIGS. 5-7. The components and operation of the paging and compression system are now described in the context of an x86 microprocessor implementation, although modifications for alternate processor architectures will be apparent to those skilled in the art.

Figure 3:
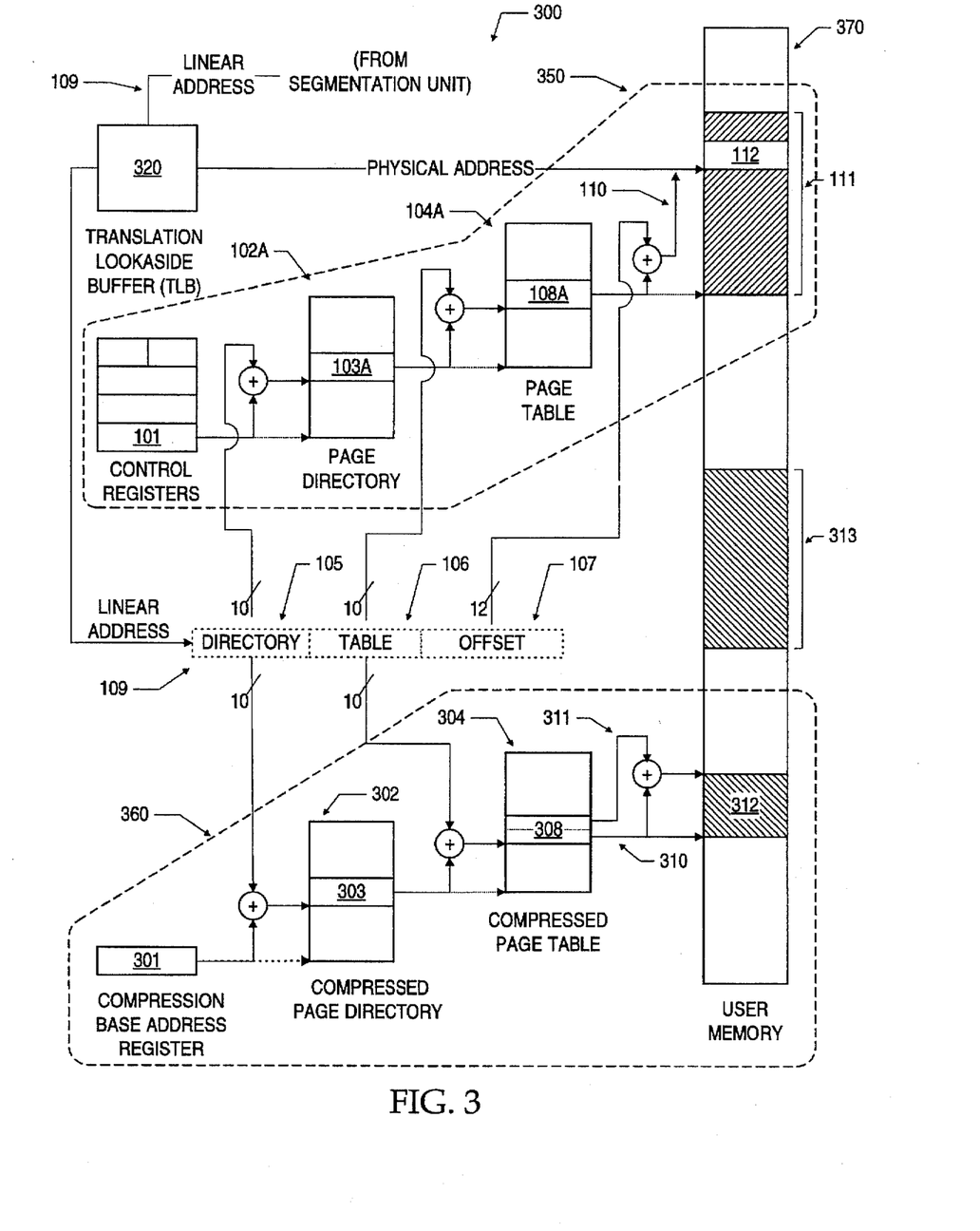
FIG. 3 is a functional block diagram depicting an exemplary embodiment of a linear-to-physical address mapping hierarchy and a linear-page-to-compressed-physical-page mapping hierarchy adapted for an x86 conforming processor in accordance with the present invention.

FIG. 3 illustrates a paging and compression system 300 adapted for a microprocessor conforming to the x86 microprocessor architecture. Paging and compression system 300 includes an address mapping hierarchy 350 and a compressed page mapping hierarchy 360. In the embodiment of FIG. 3, a translation lookaside buffer (TLB 320) receives a linear address 109 from a segmentation unit (not shown). TLB 320 caches recently used mappings from linear address space to physical address space. A memory access for which a linear-to-physical address mapping is found in TLB 320, i.e., a TLB hit, bypasses both the address mapping hierarchy 350 and compressed page mapping hierarchy 360. However, when no linear-to-physical address mapping is found in TLB 320, address mapping hierarchy 350 is used to access a particular physical address, e.g., location 112 of physical memory page 111, in user memory 370. In certain situations, which will be described below, compressed page mapping hierarchy 360 is used to access a compressed representation of a memory page, e.g., a compressed page 312. The compressed page is then decompressed into a physical memory page such as 313 and both address mapping hierarchy 350 and TLB 320 are updated include the new linear-to-physical address mapping. In the embodiment of FIG. 3, decompression and compression events are triggered in correspondence with check-ins and spills from TLB 320, although alternative embodiments may decouple TLB contents and the compression status of a memory page.

The address mapping hierarchy 350, which includes page directory 102A and page tables such as page table 104A, is similar to that described above with reference to FIG. 1A but includes modified directory entries (e.g., directory entry 103A) and modified page table entries (e.g., page table entry 108A). The page directory physical base address register 101 contains the base address of page directory 102A. A directory index portion 105 of linear address 109 provides an offset to a particular page directory entry, illustratively, to page directory entry 103A. In turn, the contents of a page directory entry identify the base address of a corresponding page table. For example, page directory entry 103A identifies the base address of page table 104A. Table index portion 106 of linear address 109 then provides an offset to a particular page table entry, illustratively, to page table entry 108A. Finally, the contents of page table entry 108A identify the base address of page frame 111 and an offset portion 107 of linear address 109 provides an offset to physical memory location 112.

The compressed page mapping hierarchy 360 parallels address mapping hierarchy 350 and the same directory index 105 and table index 106 portions of linear address 109 are used to traverse both hierarchies. However, unlike the address mapping hierarchy 350 which maps a full 32-bit linear address to a physical memory location, the compressed page mapping hierarchy 360 maps from a linear page to a compressed page (i.e., from the page in the linear address space identified by directory index 105 and table index 106 portions of a linear address such as 109 to a block of memory containing a compressed representation 312 of the page. The contents of each hierarchy are dynamic with changes in the page-in/page-out status and with the compression status of given page. Upon access, the data represented by compressed page 312 are decompressed into a physical page such as 313 and the contents of compressed page mapping hierarchy 360 and TLB 320 are updated to reflect the new linear-to-physical page mapping. Physical page 313 and compressed page 312 are alternate representations of the same data and memory page compression mechanism 300 provides demand-driven transformations between these alternate representations.

Compression base address register 301 contains the base address of a directory 302 of tables of compressed page identifiers (hereinafter, compressed page directory 302). Directory index portion 105 of linear address 109 then provides an offset to a particular entry of compressed page directory 302, illustratively, to compressed page directory entry 303. In turn, the contents of a page directory entry identify the base address of a corresponding table of compressed page identifiers. For example, compressed page directory entry 303 identifies table 304 of compressed page identifiers (hereinafter compressed page table 304). Table index portion 106 of linear address 109 then provides an offset to a particular entry of compressed page table 304, illustratively, to compressed page table entry 308. In turn, compressed page table entries identify compressed representations of memory pages. For example, compressed page table entry 308 identifies compressed page 312. Unlike a page table entry in the address mapping hierarchy 350, which is combined with the offset portion 107 of linear address 109 to identify a single physical memory location within a memory page, compressed page table entries such as 308 identify blocks of compressed data corresponding to a memory page.

Compressed page directory 302 and compressed page tables such as compressed page table 304, like their counterparts in address mapping hierarchy 350, reside in memory. In an exemplary embodiment, compressed page tables such as 304, like their page table counterparts (e.g., page table 104A), are themselves be subject to paging and therefore may be paged out of memory at any particular time. A memory access which generates an attempt to map via a compressed page table which itself is paged out of memory generates a page fault. The page fault must be serviced before the linear page address (i.e., directory index 105 and table index 106 portions of linear address 109) can be mapped to a compressed page. For efficiency reasons, many operating systems do not page out page tables. Similarly, a preferable embodiment of paging and compression system 300 would disable paging for portions of memory which include either compressed page tables (such as 304) or page tables (such as 104A). Neither compressed page directory 302 and page directory 102A (which also reside in memory) are subject to paging.

Figure 4A:
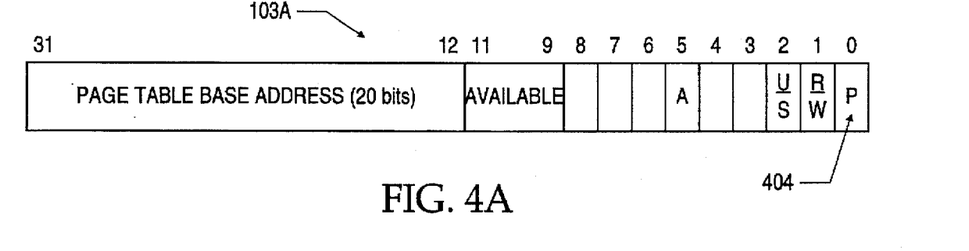
FIG. 4A is a pictorial illustration of a page directory entry.
Figure 4B:
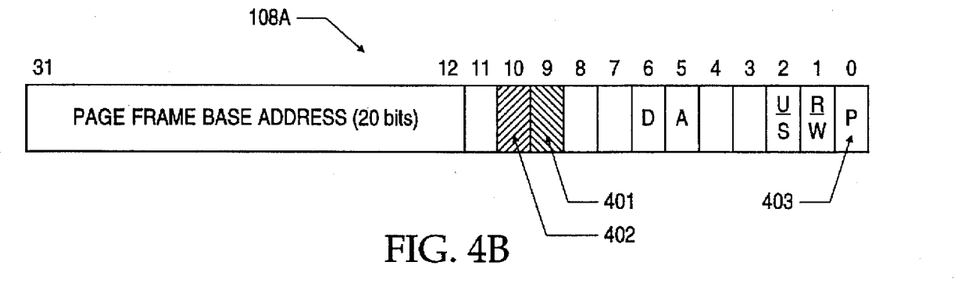
FIG. 4B is a pictorial illustration of a page table entry.

FIGS. 4A and 4B illustrate modified page directory entry 103A and page table entry 108A, respectively. The structure of these modified entries is similar to that of corresponding entries in the address mapping hierarchy 350 (described above with reference to FIG. 1B); however, page table entry 108A provides additional compression-state-related information for use in triggering a compressed page mapping. Referring now to FIG. 4A, page directory entry 103A is substantially identical to the baseline page directory entry 103 of FIG. 1B. Consequently, the mapping from page directory entries to page tables in paging and compression system 300 is compatible with existing operating system implementations.

Referring now to FIG. 4B, page table entry 108A defines two previously available bits as compressed page bit 401 and compressible page bit 402. In addition, page table entry 108A redefines page present bit 403 (as compared with the corresponding bit of the baseline page table entry 108 in FIG. 1B). Compressed page bit 401 indicates whether or not the referenced page is compressed, while compressible page bit 402 indicates whether or not the referenced page may be compressed. The compressible page bit 402 can be used by an operating system implementation to mark certain sharable resources as uncompressible. For example, compressible page bit 402 can be used to exclude memory locations, e.g., those used or shared by video or disk controllers, from the page compression mechanism.

In the embodiment of FIG. 4B, the page present bit 403, when set, encodes the presence in memory of the referenced page (in either an uncompressed or compressed state). When cleared, page present bit 403 indicates that the referenced page is unavailable because it is paged out of memory. If the referenced page is page out of memory or if it is in memory, but compressed, the referenced page is not immediately accessible and intervention by a fault handler is necessary to resolve the linear-to-physical address mapping and to enable the memory access to complete. For example, if page present bit 403 is cleared, the referenced page is not in memory and a page fault is triggered. If instead page present bit 403 and compressed page bit 401 are both set, the referenced page is stored in memory as a compressed page and a decompression fault is triggered. Page fault handling was discussed generally above with reference to FIG. 1A and suitable page fault handlers are well-known in the art. Alternate embodiments may encode states differently. For example, page present bit 403 may encode the unavailability of a referenced page whether due to compression or paging. Suitable modifications to fault handlers will be apparent to those skilled in the art.

Figure 4C:
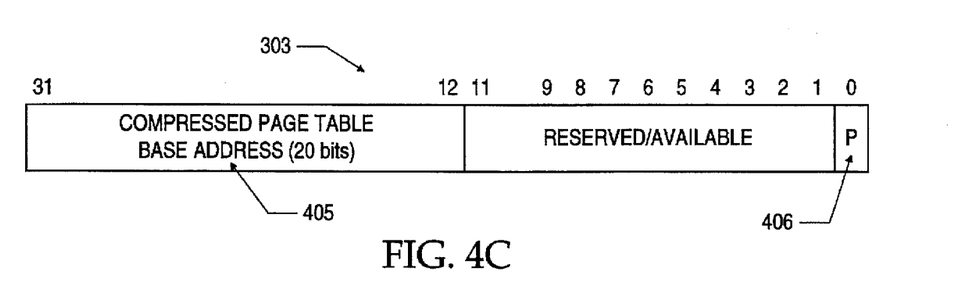
FIG. 4C is a pictorial illustration of a compressed page directory entry.
Figure 4D:
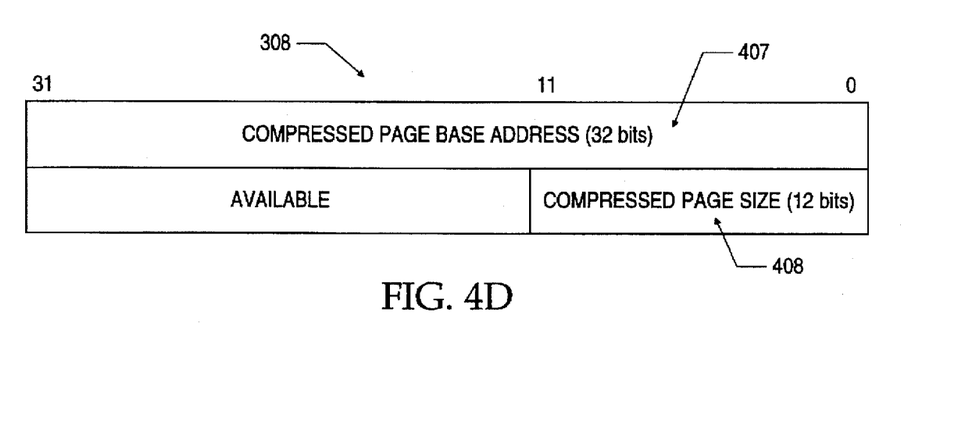
FIG. 4D is a pictorial illustration of a compressed page table entry, each in accordance with the present invention.

FIGS. 4C and 4D illustrate the structure of compressed page directory entry 303 and compressed page table entry 308, respectively. Compressed page directory entry 303 plays a role in the compressed page mapping hierarchy analogous to that of the page directory entry 103A in the address mapping hierarchy. A compressed page table base address field 405 of compressed page directory entry 303 identifies the base address of a corresponding compressed page table. In the x86 compatible embodiment of FIG. 3, compressed page tables such as 308 (and page tables such as 108A) include 1024 32-bit DWORDs (i.e., 4096 Bytes). Like their page table counterparts, compressed page tables such as 304 are of fixed size and are aligned in memory on fixed size boundaries. As a result, the 20-bit quantity defined by directory index 105 and table index 106 portions of linear address 109B can be used to uniquely identify a compressed page table such as 308 in memory. Alternate directory and table sizings, alignments, and address encodings are also suitable and appropriate modifications will be apparent to those skilled in the art.

Referring again to FIG. 4C, a compressed page table present field, P 406, encodes the presence (or absence) in memory of the compressed page table identified by compressed page table base address field 405. The remaining bits of compressed page directory entry 303 are reserved/ available. An attempt to map through an absent compressed page table triggers a page fault. As previously described, a preferable embodiment of the operating system component 292 of paging and compression system 300 would disable the paging of those portions of memory which include a compressed page table (such as 304). Therefore in such an embodiment, a page fault of this type would indicate a system software bug. However, alternative embodiments which allow paging of compressed page tables and/or page tables could service the page fault and retry the memory access.

FIG. 4D depicts the organization of a compressed page table entry such as 308. Each compressed page table entry includes two 32-bit quantities (or DWORDs in x86 terminology). The first DWORD represents the full 32-bit base address 407 in memory of the compressed page identified by compressed page table entry 308. The second DWORD includes a compressed page size field 408. In the x86 compatible embodiment of FIG. 3, wherein a memory page includes $2^{12}$ (or 4096) individually addressable bytes, the compressed page size field is 12 bits. Suitable variations for systems providing larger and smaller pages and for systems such as most RISC architectures which disallow non-aligned memory accesses will be apparent to those skilled in the art.

Figure 5:
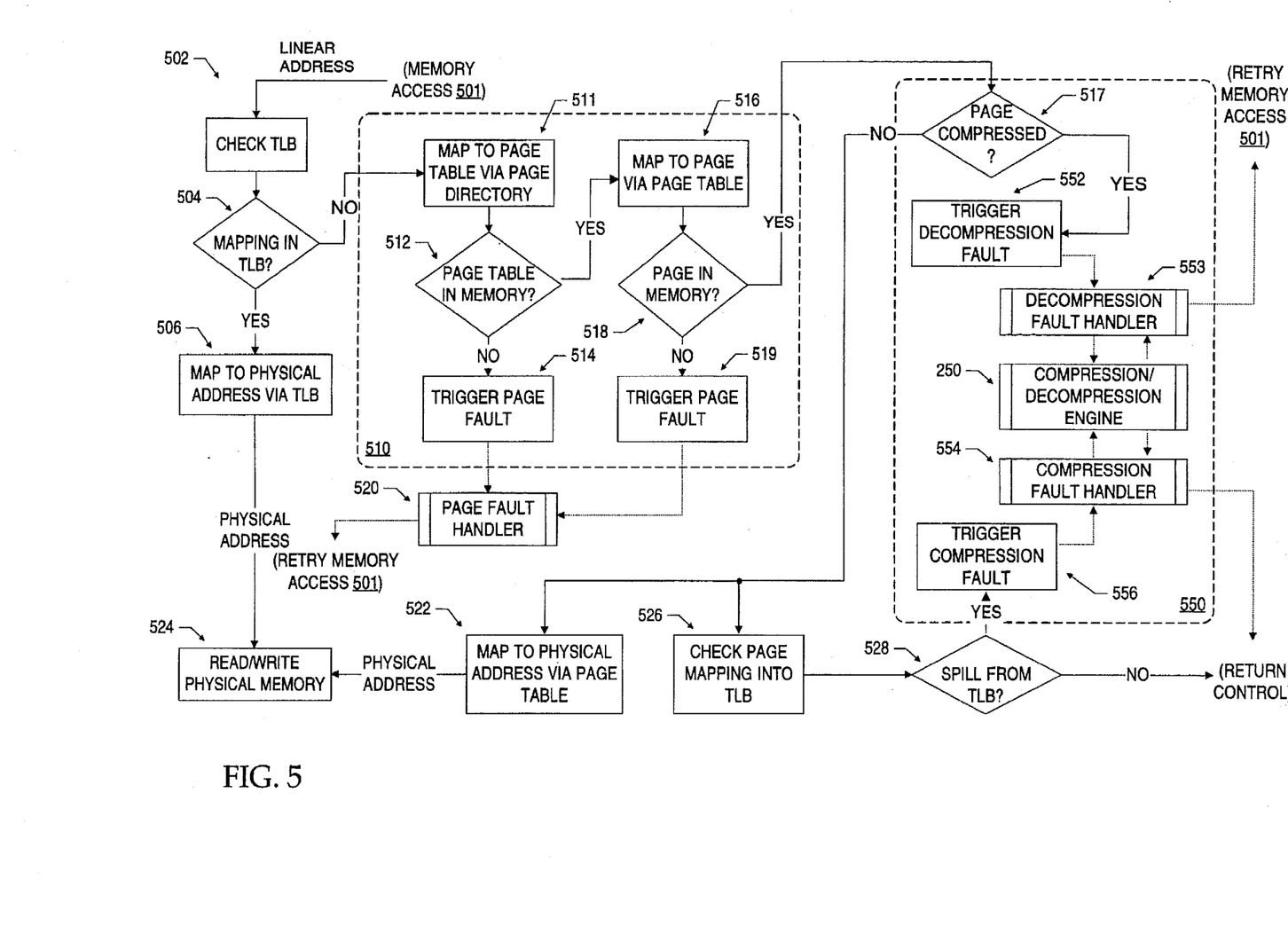
FIG. 5 is a flow diagram depicting the operation of a memory paging system providing memory page compression in accordance with the present invention.

FIG. 5 depicts a sequence of operations performed by the operating system component 292 of memory paging and compression system 300. Operating system component 292 reads and manipulates the contents of data structure component 294 to traverse the address mapping 350 and compressed page mapping 360 hierarchies defined therein. Additionally, operating system component 292 triggers compression/decompression engine 250 to transform between compressed and uncompressed representations of memory pages. On a memory access 501 (i.e., a memory read or write), operating system component 292 receives a linear address and checks (in step 502) the contents of TLB 320 to determine whether an entry in TLB 320 caches a physical address mapping for the linear address. If an entry matching the linear address is found, that entry is used to map the linear address to a physical address in step 506 and a physical memory address is accessed in step 524.

In the exemplary embodiment, TLB 320 is a 64- or 128-entry fully associative cache with a least recently used (LRU) replacement policy. Although an x86 conforming TLB is typically a 32-entry, 2- or 4-way set associative cache with a pseudo-random replacement algorithm, the larger size, full associativity and LRU policy of TLB 320 are preferable because, as described below, memory paging and compression system 300 maintains a correspondence between the set of uncompressed memory pages and the contents of TLB 320. Pages are compressed and decompressed in respective correspondence with spills from and loads to TLB 320. Suitable implementations of a large fully associative cache with an LRU replacement policy are well known in the art. TLB 320 is any such suitable implementation.

If no entry matching the linear address is found, the contents of address mapping hierarchy 350 (rather than the contents of TLB 320) are used to map to a physical address. Address mapping component 510 performs the linear-to-physical address mapping. In step 511, operating system component 292 indexes into page directory 102A to a page directory entry referencing a particular page table such as 104A (recall FIG. 3). If the referenced page table is not present in memory (see decision point 512), a page fault is triggered in step 514, although as previously discussed, a preferable implementation of operating system component 292 would disable paging for those portions of memory containing the directories and tables of address mapping hierarchy 350 and compressed page mapping hierarchy 360. In the exemplary embodiment of FIG. 5, control is transferred to a page fault handler 520 which loads a memory page containing the referenced page table and updates the address mapping hierarchy to reflect an updated paging state of memory. After loading the memory page and updating address mapping hierarchy 250, page fault handler 520 returns control and memory access 501 is retried. Suitable implementations of a page fault handler are well known in the art and page fault handler 520 is of any suitable implementation.

Continuing forward from decision point 512, if the referenced page table is available in memory (as indicated by a set state of the page table present bit 404 in the corresponding page directory entry), then the contents of the page table entry are used to map to a particular physical memory page in step 516. If the physical memory page so mapped is unavailable in memory, as indicated by a cleared state of the page present bit 403 in the corresponding page table entry (see decision point 518), then a page fault is triggered in step 519. As with the handling of page faults triggered in step 514, control is transferred to page fault handler 520 which loads the absent memory page and updates address mapping hierarchy 350 to reflect an updated paging state of memory. After loading the memory page and updating the address mapping hierarchy, page fault handler 520 returns control and memory access 501 is retried.

If instead, page present bit 403 is set (indicating that the physical memory page mapped in step 516 is available), a further check is made. Compressed page bit 401 (recall FIG. 4B) is checked at decision point 517. If compressed page bit 401 is cleared, the corresponding page frame is uncompressed in memory and memory access 501 may immediately be resolved by combining (in step 522) the offset portion 107 of linear address 109 with the page frame base address contained in the corresponding page table entry. Finally, after each of the mapping stages through page directory and page table entries is complete, physical memory is read (or written) in step 524 using the mapped physical address supplied in step 522.

Coincident with step 522, the linear-to-physical page address mapping represented by the page frame base address field of the page table entry is added to TLB 320 in step 526. Depending on the then-current contents of TLB 320, the TLB addition, i.e., "check in," of step 526 may cause another linear-to-physical page address mapping to "spill" from the fixed-size TLB 320 (see decision point 528). Such a spill is handled by triggering a compression fault in step 556 whereby the page in physical memory corresponding to the spilled entry is compressed and the states of directory and page table entries in address mapping hierarchy 350 and compressed page mapping hierarchy 360 are updated. Compression fault handler 554 services the compression fault and triggers compression/decompression engine 250. Compression/decompression engine 250 compresses the spilled page and signals its completion. Compression fault handler 554 then updates entries of the address mapping compressed page mapping hierarchies (350 and 360) and returns control. The operation of compression/decompression component 550, which performs transformations between uncompressed and compressed representations of memory pages, is described in greater detail below with reference to FIGS. 6 and 7.

Referring back to decision point 517, if the referenced memory page is available in memory (see decision point 518) but compressed (i.e., compressed page bit 401 of the corresponding page table entry is set), a decompression fault is triggered in step 552. Decompression fault handler 553 services the decompression fault in conjunction with compression/decompression engine 250 by traversing the compressed page mapping hierarchy 360 (which mirrors address mapping hierarchy 350) to identify the block of memory into which the mapped page has been compressed (recall compressed page 312 of FIG. 3).

Decompression fault handler 553 allocates a physical memory page to receive a decompressed page and passes the base address and size identifying the compressed page block to compression/decompression engine 250. Decompression fault handler 553 also signals that decompression is to be performed. Compression/Decompression engine 250 then decompresses the compressed page into the physical memory page allocated by decompression fault handler 553 and returns control to the decompression fault handler 553. Decompression fault handler 553 updates the states of directory and page table entries in address mapping hierarchy 350 and compressed page mapping hierarchy 360. Decompression fault handler 553 then returns control and memory access 501 is retried.

Figure 6:
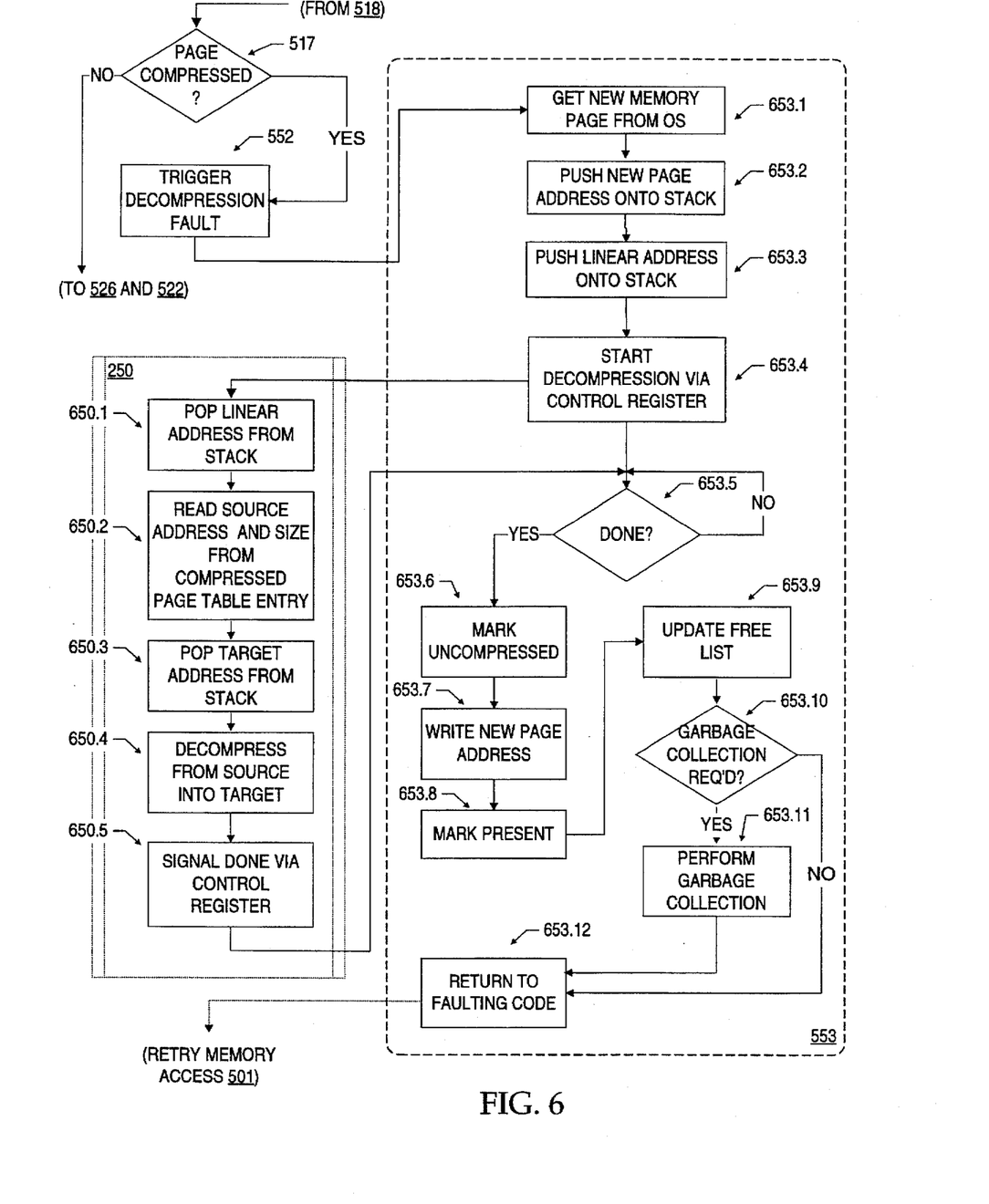
FIG. 6 is a flow diagram depicting the operation of a decompression fault handler and a compression/decompression engine in accordance with the present invention.

The operation of decompression fault handler 553 is now described with reference to FIG. 6. As previously described, a decompression fault is triggered in step 552 if the referenced page is identified as compressed at decision point 517. In response, decompression fault handler 553 gets a new memory page from the operating system (in step 653.1). Methods and structures providing operating system support for allocation of new pages in a paged memory management system are well known in the art and operating system handling of step 653.1 is by any such methods and structures. The physical address of this new memory page is pushed onto the stack in step 653.2. Decompression fault handler 553 also pushes the linear address of the faulting memory access onto the stack in step 653.3.

In step 653.4, decompression fault handler 553 starts compression/decompression engine 250, selecting the decompression operation by setting a bit in a control register of MSRs 296, then loops until compression/decompression engine 250 signals completion. In the exemplary embodiment of FIG. 6, decompression fault handler 553 loops (see decision point 653.5) on the state of a control register bit (of MSRs 296) set by compression/decompression engine 250. Control registers and control register bits are collectively depicted in the exemplary embodiment of FIG. 2 as MSRs 296; however, such a depiction is merely illustrative and alternate embodiments may provide other commonly accessible storage locations, including but not limited to other types of registers and memory locations. References to control registers and/or control register bits herein will be understood by those skilled in the art to encompass a variety of potential storage locations commonly accessible to compression/decompression engine 250 and fault handlers 553 and/or 554.

Responsive to the control register state set by decompression fault handler 553, compression/decompression engine 250 pops the faulting linear address from the stack (step 650.1) and retrieves (in step 650.2) the physical address and size of the corresponding compressed memory page from a compressed page table entry such as 308 (recall FIG. 4D). In step 650.2, compression/decompression engine 250 traverses compressed page mapping hierarchy 360 to the referenced compressed page table entry using the contents of compression base address register 301 and the directory and table index portions (105 and 106) of the faulting linear address as described above with reference to FIG. 3. The physical address and size so retrieved identify the source block for decompression. Compression/decompression engine 250 then pops the target address for decompression (i.e., the new page address) from the stack in step 650.3 and decompresses from the source block to the target address in step 650.4. Compression/decompression engine 250 signals completion by setting a control register bit which decompression fault handler 553 checks at decision point 653.5.

Once decompression fault handler 553 detects the completion of decompression by compression/decompression engine 250, it marks the page table entry corresponding to the now decompressed memory page as uncompressed (step 653.6) and present (step 653.8) and writes the directory and table index portions (105 and 106) of the new page address to the page frame base address field. Decompression fault handler 553 identifies the correct page table entry by traversing address mapping hierarchy 350 using the directory and table index portions (105 and 106) of the faulting linear address.

A free-list of available portions of the compressed page space of memory 210 is updated in step 653.9 to reflect the portion freed by decompression into the newly allocated memory page. If garbage collection is required to defragment the compressed page space of memory 210, it is performed in step 653.11. Decompression fault handler 553 then returns to the faulting code in step 653.12 and memory access 501 is retried in accordance with the flow of FIG. 5. In the exemplary embodiment, decompression fault handler 553 is implemented as critical section code.

Suitable methods and structures for maintaining a free-list are well known in the operating system arts. The implementation of step 653.9 and of a complementary step in compression fault handler 554 (see free-list scanning step 754.1 in FIG. 7) are of any such suitable design. Similarly, suitable methods and structures for performing garbage collection are well known in the operating system arts. Identification of a fragmentation threshold at decision point 653.10 and the implementation of garbage collection in step 653.11 are of any such suitable design. Although free-list updating and garbage collection are shown in the exemplary embodiment of FIG. 6 as steps in the sequence of operations performed by decompression fault handler 553, alternate embodiments may perform free-list maintenance in compression/decompression engine 250. Additionally, alternative embodiments may perform garbage collection asynchronously with respect to the operation of decompression fault handler 553 and/or compression/decompression engine 250.

Figure 7:
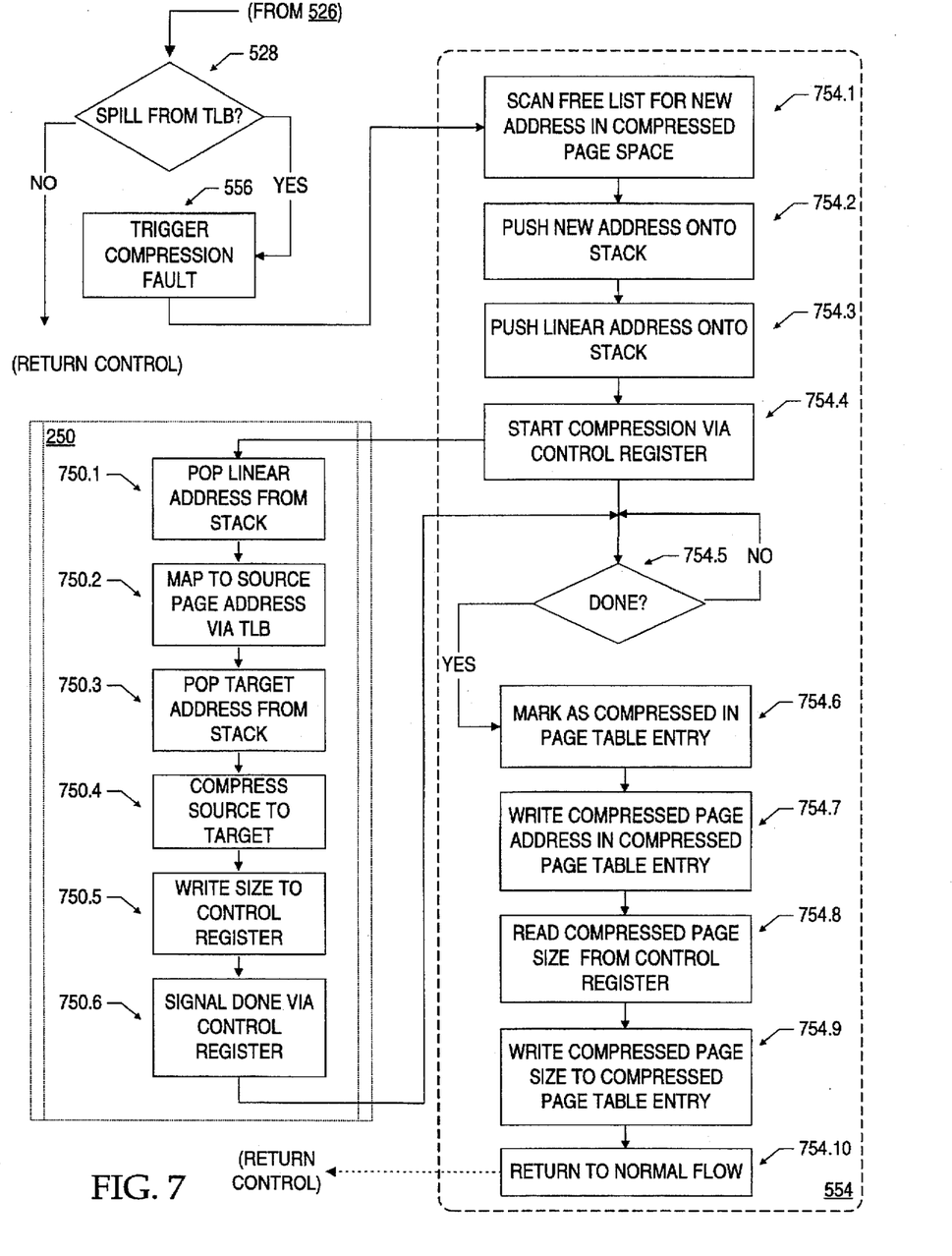
FIG. 7 is a flow diagram depicting the operation of a compression fault handler and a compression/decompression engine in accordance with the present invention.

The operation of compression fault handler 554 is now described with reference to FIG. 7. As previously described, a compression fault is triggered in step 556 if a spill from TLB 320 is detected at decision point 528. In response, compression fault handler 554 scans the free-list in step 754.1 and returns the address of a block in the compressed page space (i.e., a target address) to which the spilled memory page can be compressed. Suitable methods and structures for implementation of the scanning and maintenance of a free-list are well known in the operating system arts and step 754.1 is of any such suitable implementation. Compression fault handler 554 pushes the target address returned by 754.1 to the stack in step 754.2. Compression fault handler 554 also pushes the faulting linear address to the stack in step 754.3 and starts compression/decompression engine 250 in step 754.4, selecting the compression operation by setting a bit in a control register. In the exemplary embodiment of FIG. 7, compression fault handler 554 loops (see decision point 754.5) on the state of a control register bit set by compression/decompression engine 250.

Responsive to the control register state set by compression fault handler 554, compression/decompression engine 250 pops the faulting linear address from the stack (step 750.1) and reads the base address of the spilled page frame from TLB 320 in step 750.2. In step 750.2, compression/decompression engine 250 references into TLB 320 using the directory and table index portions (105 and 106) of the faulting linear address. The base address of the spilled page frame read in step 750.2 identifies the physical memory page to be compressed (i.e., the source page).

Compression/decompression engine 250 then pops the target address for compression (i.e., the address scanned from the free-list in step 754.1) from the stack in step 750.3. In step 750.4, compression/decompression engine 250 compresses from the source page to the block of memory 210 identified by the target address. Compression/decompression engine 250 then writes the size of the resulting compressed block to a control register in step 750.5 and signals completion by setting a control register bit (in step 750.6) which compression fault handler 554 checks at decision point 754.5.

Once compression fault handler 554 detects the completion of compression by compression/decompression engine 250, it updates the entries of address mapping hierarchy 350 and compressed page mapping hierarchy 360 corresponding to the source page and target block respectively. In particular, compression fault handler 554 marks the compressed page bit 401 of the page table entry corresponding to the now compressed memory page as compressed (step 754.6). Compression fault handler 554 also writes the 32-bit target address to the compressed page base address field 407 of the compressed page table entry corresponding to the now compressed memory page in step 754.7. Compression fault handler 554 identifies the correct page table entry and compressed page table entry by respectively traversing address mapping hierarchy 350 and compressed page mapping hierarchy 360 using the directory and table index portions (105 and 106) of the faulting linear address.

The image size of a compressed page may vary depending on the particular data represented in the memory page compressed. Therefore, compression/decompression engine 250 records the image size of the compressed page in a control register in step 750.5. Compression fault handler 554 in turn reads the image size from the control register in step 754.8 and writes the compressed page size field 408 of the compressed page table entry corresponding to the now compressed memory page in step 754.9. As before, compression fault handler 554 identifies the correct compressed page table entry by traversing compressed page mapping hierarchy 360 using the directory and table index portions (105 and 106) of the faulting linear address.

Suitable compression algorithms, including hardware implementations thereof, are well known in the art. In the exemplary embodiment, compression engine 250 includes a hardware implementation of any such suitable algorithm. In an alternate embodiment, compression/decompression engine 250 is implemented as software and the compression and decompression functions thereof may be respectively integrated with compression fault handler 554 and decompression fault handler 553.

While the invention has been described with reference to various embodiments, it will be understood that these embodiments are illustrative and that the scope of the invention is not limited to them. Many variations, modifications, additions, and improvements of the embodiments described are possible. For example, the use of a program stack and of control registers for address and state communication between compression/decompression engine 250 and the compression and decompression fault handlers (554 and 553) is merely illustrative. Alternative embodiments may incorporate other structures and/or methods for communicating addresses and/or states. Furthermore, alternative embodiments may incorporate different combinations of structures and methods for communicating addresses and states.

Alternative embodiments may provide for a different distribution of functionality among the compression/decompression engine 250 and the compression and decompression fault handlers (554 and 553). For example, compression/decompression engine 250 may perform some or all of the updates to the entries of address mapping hierarchy 350 and compressed page mapping hierarchy 360. Alternatively, compression fault handler 554 and decompression fault handler 553 may be included in a software implementation of compression/decompression engine 250.

Furthermore, compression/decompression engine 250 may be implemented in software, rather than as hardware. Similarly, some or all of the functionality of decompression fault handler 553 and/or compression fault handler 554 may be implemented in hardware. For example, as part of a paged memory management unit. These and other variations, modifications, additions, and improvements may fall within the scope of the invention as defined in the claims which follow.

What is claimed is:

1. A memory paging system for a computer having a memory and an execution unit addressing the memory using virtual addresses, the memory paging system comprising:

an address mapping hierarchy, the address mapping hierarchy including a plurality of page tables having page table entries mapping from a first portion of virtual addresses to respective pages in physical memory;

a compressed page mapping hierarchy, the compressed page mapping hierarchy including a plurality of compressed page tables having compressed page table entries mapping from the first portion of virtual addresses to respective compressed pages in physical memory;

a translation lookaside buffer for caching recently used ones of the mappings from the first portion of virtual addresses to respective pages in physical memory; and a compression/decompression component including a compression/decompression engine coupled between the memory and the execution unit for alternately compressing and decompression pages in memory in respective correspondence with spills from and loads to the translation lookaside buffer.

2. A memory paging system, as recited in claim 1, wherein the address mapping hierarchy and the compressed page mapping hierarchy are represented in the memory, and wherein the compression/decompression component further includes:

a decompression fault handler executable on the execution unit; and a compression fault handler executable on the execution unit; wherein decompression fault handler and compression fault handler respectively trigger decompression and compression operations of the compression/decompression engine; decompression fault handler and compression fault handler updating the states of address mapping hierarchy and compressed page mapping hierarchy in correspondence with transformations between uncompressed and compressed representations of a given page.

3. A memory paging system, as recited in claim 1, wherein the translation lookaside buffer is organized as fully associative cache with a least recently used replacement policy.

4. A memory paging system, as recited in claim 2, wherein the decompression fault handler is responsive to a faulting memory access and comprises:

means for allocating a new memory page;

means for supplying a physical address of the new memory page to the compression/decompression engine;

means for supplying a virtual address of the faulting memory access to the compression/decompression engine;

means for triggering decompression by the compression/decompression engine, the decompression being from a compressed representation of the page corresponding to the faulting memory access to an uncompressed representation of same at the new memory page; and means for updating the address mapping hierarchy to indicate the physical address of the new memory page and uncompressed state of the corresponding page.

5. A memory paging system, as recited in claim 4, wherein the decompression fault handler communicates with the compression/decompression engine via control registers.

6. A memory paging system, as recited in claim 4, wherein the decompression fault handler communicates with the compression/decompression engine via a stack.

7. A memory paging system, as recited in claim 2, wherein the compression fault handler is responsive to a spill from the translation lookaside buffer and comprises:

means for scanning a free-list for a new block in a compressed memory space;

means for supplying a physical address of the new block to the compression/decompression engine;

means for supplying a virtual address of the faulting memory access to the compression/decompression engine;

means for triggering compression by the compression/decompression engine, the compression being from an uncompressed representation of the page corresponding to the faulting memory access to an compressed representation of same at the new block;

means for updating the address mapping hierarchy to indicate the compressed state of the corresponding page; and means for updating the compressed page mapping hierarchy to indicate the physical address and size of the corresponding compressed page.

8. A memory paging system, as recited in claim 7, wherein the compression fault handler communicates with the compression/decompression engine via control registers.

9. A memory paging system, as recited in claim 7, wherein the compression fault handler communicates with the compression/decompression engine via a stack.

10. A memory paging system, as recited in claim 1, wherein the compression/decompression component is integrated with an address translation component of an operating system.

11. A memory paging system, as recited in claim 2, wherein the page table entries of the address mapping hierarchy include a compressed page indication for indicating the compression state of the respective page, and wherein compression/decompression component triggers decompression fault handler in response to a compressed page indication.

12. In a memory paging system for a computer having an execution unit, a memory including a hierarchy of data stores for encoding a mapping from virtual memory addresses to physical memory addresses, and a translation lookaside buffer for caching recently-used virtual to physical address mappings, a compression/decompression subsystem comprising:

a compression/decompression engine coupled between the execution unit and the memory for alternately compressing and expanding memory-resident pages;

means residing in the hierarchy of data stores for identifying a compression state of memory-resident pages, the compression state identifying means triggering a compression fault upon a spill from the translation lookaside buffer, the compression state identifying means triggering a decompression fault upon an access to a memory page not represented in the translation lookaside buffer and identified as compressed by the compression state identifying means;

a decompression fault handler responsive to the decompression fault, the decompression fault handler allocating memory for a decompressed memory page, triggering a decompression operation of the compression/decompression engine, and updating the hierarchy of data stores in accordance with the decompression operation; and a compression fault handler responsive to the compression fault, the compression fault handler scanning a free-list for a target memory block, triggering compression operation of the compression/decompression engine, and updating the hierarchy of data stores in accordance with the compression operation.

13. A compression/decompression subsystem, as recited in claim 12 wherein the means residing in the hierarchy of data stores for identifying a compression state of memory-resident pages includes a compressed page indicating field in page table entries corresponding to memory resident pages.

14. A compression/decompression subsystem, as recited in claim 12 further comprising:

means residing in the hierarchy of data stores for identifying a compressed representation of the page corresponding to a given virtual memory address.

15. A compression/decompression subsystem, as recited in claim 14, wherein the means residing in the hierarchy of data stores for identifying a compressed representation of the page corresponding to a given virtual memory address includes compressed page table entries, each compressed page table entry having a compressed page base address field and a compressed page size field, the compressed page base address and compressed page size fields identifying a variable-size block in the memory containing the compressed representation of the page corresponding to the given virtual memory address.

16. In a memory paging and compression system, a method for handling a decompression fault arising from a faulting memory access, the method comprising the steps of:

allocating a new memory page;

supplying a physical address of the new memory page to a compression/decompression engine;

supplying a virtual address of the faulting memory access to the compression/decompression engine;

triggering decompression by the compression/decompression engine, the decompression being from a compressed representation of the page corresponding to the faulting memory access to an uncompressed representation of same at the new memory page; and updating an address mapping hierarchy to indicate the physical address of the new memory page and uncompressed state of the corresponding page.

17. A method for handling a decompression fault, as recited in claim 16, comprising the additional steps of:

mapping to the compressed representation in memory using the virtual address of the faulting memory access supplied in the virtual address supplying step, a portion of the virtual address indexing into a corresponding compressed page table entry, wherein the compressed page table entry includes compressed page base address and compressed page size fields identifying a variable-size block in memory containing the compressed representation of the page corresponding to the virtual address; and decompression the variable-sized block identified in the compressed representation mapping step into the new memory page.

18. A method for handling a decompression fault, as recited in claim 16, wherein the physical address supplying step and the virtual address supplying step include pushing the physical address and the virtual address to a stack.

19. In a memory paging and compression system, a method for handling a compression fault, the method comprising the steps of:

scanning a free-list for a new block in a compressed memory space;

supplying a physical address of the new block to a compression/decompression engine;

supplying a virtual address of a faulting memory access to the compression/decompression engine;

triggering compression by the compression/decompression engine, the compression being from an uncompressed representation of the page corresponding to the faulting memory access to an compressed representation of same at the new block;

updating an address mapping hierarchy to indicate a compressed state of the corresponding page; and updating a compressed page mapping hierarchy to indicate the physical address and size of the corresponding compressed representation.

20. A method for handling a compression fault, as recited in claim 19, comprising the additional steps of:

mapping to the uncompressed representation in memory using the virtual address of the faulting memory access supplied in the virtual address supplying step, a portion of the virtual address indexing into a corresponding translation lookaside buffer entry, wherein the translation lookaside buffer entry includes base address in memory of the uncompressed representation of the page corresponding to the virtual address;

compressing the page identified in the uncompressed representation mapping step into the new block in the compressed memory space; and returning a size of the compressed representation.

21. A method for handling a compression fault, as recited in claim 19, wherein the physical address supplying step and the virtual address supplying step include pushing the physical address and the virtual address to a stack, and wherein the size returning step includes storing the size of the compressed representation to a control register.

* * * * *